INVENTOR
Charles C. Hutchins and
Frank G. Logan
By Thomas G. Miller
Their attorney

EXPLANATION OF POTIER REACTANCE

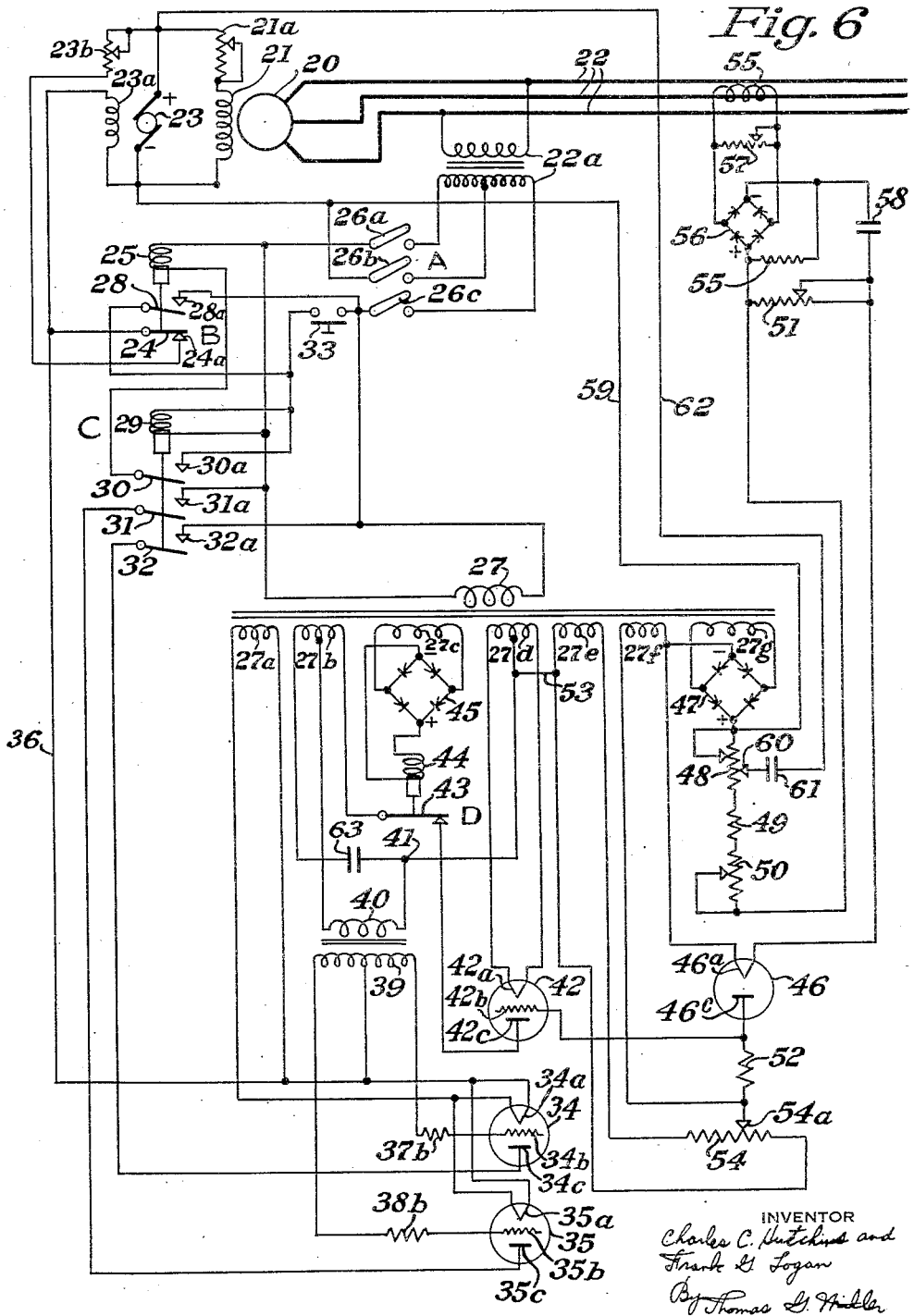

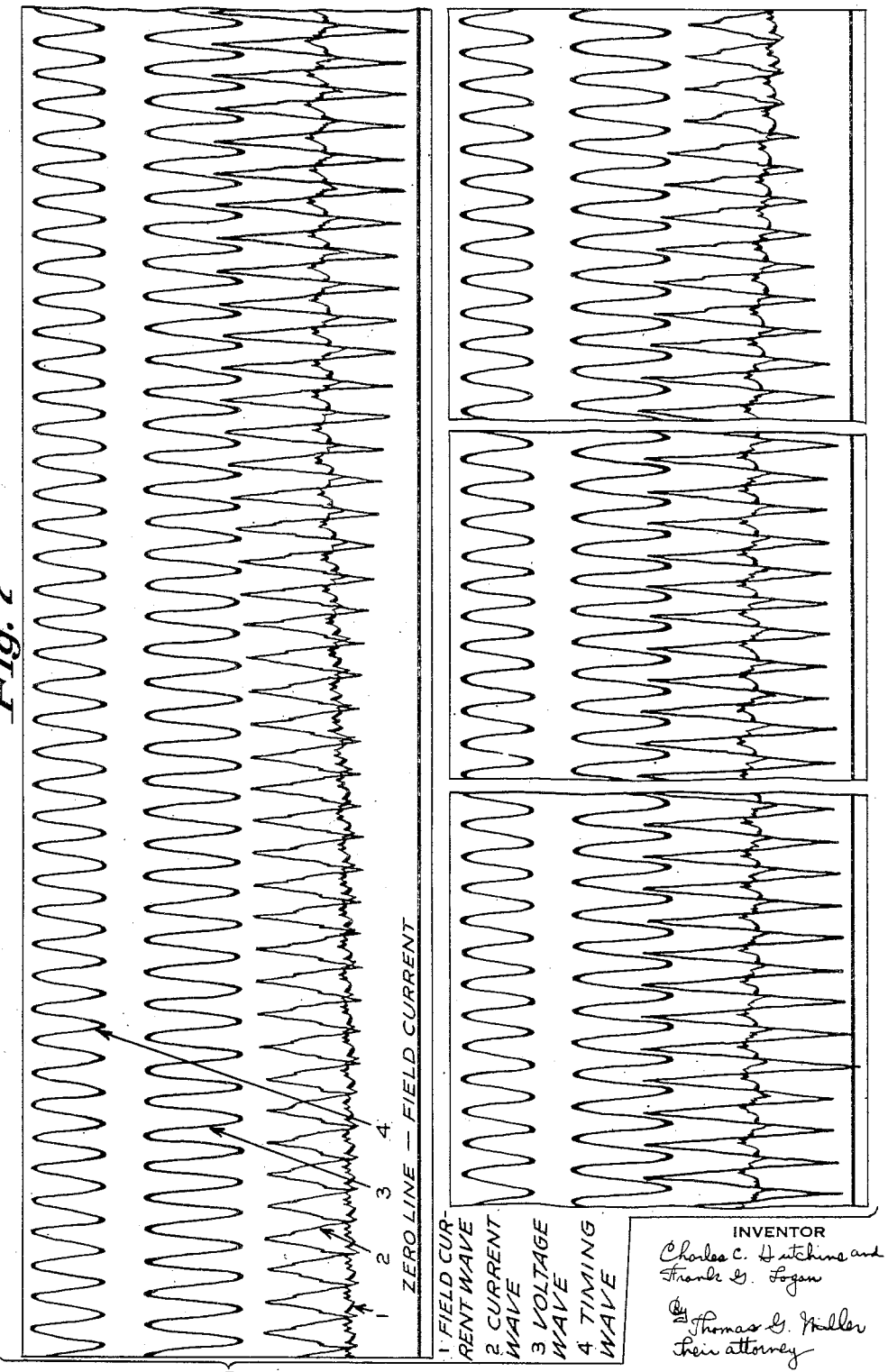

Patented Oct. 20, 1942

2,299,325

UNITED STATES PATENT OFFICE 2,299,325

DYNAMOELECTRIC CONTROL SYSTEM

Charles C. Hutchins, Ridgway, Pa., and Frank G. Logan, Mount Vernon, N. Y., assignors to Elliott Company, Pittsburgh, Pa., a corporation of Pennsylvania Application November 13, 1939, Serial No. 303,986

13 Claims. (Cl. 171—119)

Our invention relates to improved control systems and method of control, particularly as applied to dynamoelectric machines and voltage regulating apparatus in combination, for maintaining a substantially steady constant voltage under changing load conditions on the lines, especially when such changes are abrupt. The invention is particularly applicable to synchronous generators and where the requirements of control are especially exacting.

The present invention radically departs from prior methods of control and is based upon procedure which is quite contrary to prior theories and modes of solution. In attempting to maintain a constant voltage, prior investigators have directed their efforts to obtaining a quick response control and regulation and have also proposed a quick repsonse excitation system wherein the regulator and exciter were designed to change the excitation of the main generator before the transient voltage set-up in the main generator by the change in load or power factor had resulted in a main flux collapse of more than approximately 5%, the object being to apply the offsetting voltage to the field of the generator before the current changes induced in the field winding by the change in load had ceased. Aside from the mechanical and design difficulties and expense involved in such a system, the results were not satisfactory in failing to overcome the presence of uneven or variable voltages at the terminals of the generator. This was due to the presence of a transient increase and decrease above and below the desired voltage before stability was finally obtained. Although such a system has been designated a quick response system, its ability to bring the terminal voltage to the desired value within a short time is poor.

In such a system, reliance for quick response was based upon the use of a specially designed exciter having a high speed of response; the use of a high resistance, high voltage regulator control was avoided as impractical. And, it was impossible to effect regulation of the air-gap flux of the generator by speeding up the response until after a considerable period of time within which the voltage oscillated above and below the normal voltage.

We have found that the effort to counteract the transient effects by the regulating means has been based upon a misconception; and that until the transient or transients have faded out (for example, after a line to ground short-circuit fault has occurred), the regulating means is practically useless. Although the regulating means may attempt to counteract the transient effects, no regulator of a response type can maintain the voltage at or near normal until after the transient or transients have disappeared, unless the fault is sufficiently removed so that the system assimilates the effect as a load change. The character of these transients is determined by the inherent features of the connected machines and equipment on the system and their duration is usually of the order of not less than a 180 cycle, or approximately three seconds in average cases.

All the vector theory is predicated on the assumption of sine-shaped waves. As the result, a so-called positive sequence network for a regulator that responds to the normal fundamental component is useless for following the multiplicity of wave shapes that occur due to faults. Where the regulator is set to respond to predetermined harmonics, it will still be sensitive to the wave shape following the transient. It follows that the use of voltage-change indication circuits are of little importance insofar as their operation during so-called fault conditions is concerned.

An object of the present invention is to obtain a highly efficient and effective system and method of control that will maintain a substantially constant voltage at the terminals of the generator, especially where the requirements of the system are particularly exacting. Another object is to accomplish these results by comparatively inexpensive apparatus that will be dependable in long continued use and obtain satisfactory results particularly where long distribution lines are used and where the system is subjected to abrupt changes in load. These and many other objects will appear to those skilled in the art from the drawings, the specification, and the claims.

In the present invention the former theories and methods of control have been radically departed from. Instead of attempting to quicken the response of the exciter and regulator control, we have provided a sensitive control system which is utilized in combination with a synchronous machine, or main generator, in such a manner that the stability of the generator is greatly increased and tends to offset any undesirable flux and field current changes produced by changes in the load. That is, instead of attempting to speed up the response of the exciter system in the endeavor to offset and counteract changes before their effects can become predominant, we obtain far superior results by combining with the control system a form of generator in such a manner that the effects of changes in the load on the generator are choked and delayed and the regulator is able to respond and carry out its corrective action before any substantial change in the line voltage can take place. The required stability of the generator for this purpose is attained by increasing its inductance to load changes, especially to abrupt changes and of a character that will become increasingly effective, the greater the change in load. Such a result is obtained or greatly aided by providing the field poles of the generator with effective damping means, such as damping windings. As an example, the winding arrangement shown in the Hutchins Patent No. 2,087,406 may be successfully employed, or in some cases, solid field pole faces may be utilized, or both the damping winding and solid pole faces may be employed, according to the requirements.

Furthermore, as regards the regulator in our improved system, the same is made so sensitive to minute changes upon change of load that before any material change in the terminal voltage of the machine has occurred, the regulator will cause a pronounced corrective change of voltage to be applied to the field winding of the generator and thereby have opportunity to introduce a pronounced corrective effect during the period when the high mutual inductance, low leakage, and the damping action of the generator are providing a time-delay interval for such corrective action to take place. In this manner, the voltage of the generator is maintained substantially constant. The reactions in the generator are delayed until the regulator has had time to apply a pronounced corrective action, and thus, sole reliance is not placed upon further hastening the action of the regulating system.

Furthermore, instead of utilizing a special quick response exciter, we provide regulation wherein the control is dependent upon a high resistance control circuit and upon the use of variable high voltages which change pronouncedly in response to minute changes of load current or minute change of voltage at the terminals of the generator to be controlled. Field windings subjected to these high controlling voltages are provided with high insulation for withstanding the abrupt voltage changes imposed thereon by the regulator. The control voltage may have peak values as high as 1000 to 2500 volts which are abruptly imposed, when necessary, for preventing the generator voltage from being affected, not only during the period in which the field current transients are suppressed, but also after their effects have disappeared.

The accompanying drawings illustrate a preferred embodiment of the invention and also include explanatory diagrams and charts.

Figure 6 is a diagram of controlling apparatus utilized in combination with the special form of synchronous machine; and Figure 7 shows reproductions of oscillograms disclosing results obtained by the present invention; the lower portions of Figure 7 are continuations of the upper portions.

Figure 1:
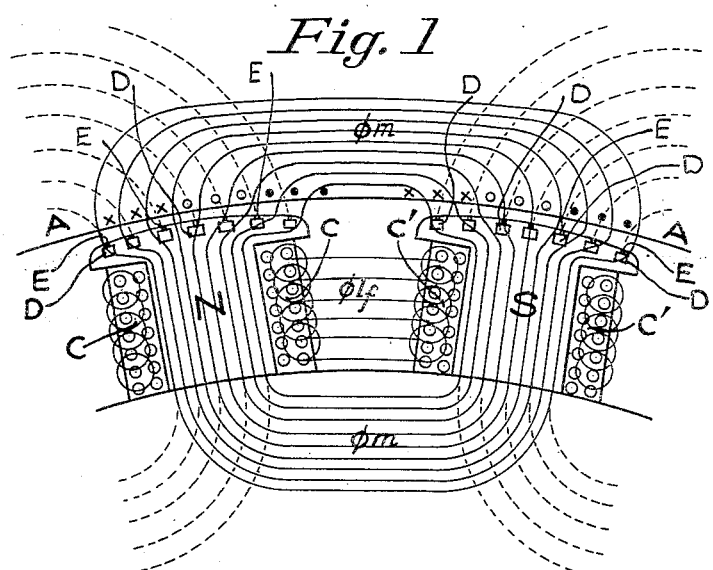
Figure 1 is a section showing a portion of a synchronous generator having damping means applied to the faces of the field poles for aiding in obtaining a highly inductive and damping electromagnetic circuit for use in combination with the controlling apparatus, the figure being partially diagrammatic for purposes of explanation.
Figure 1A:
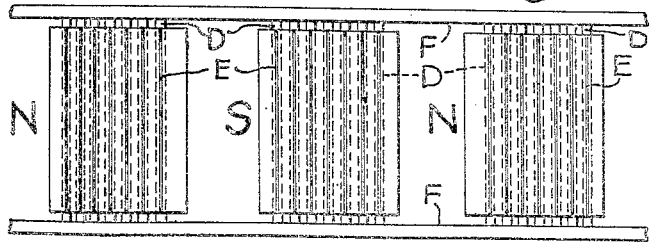
Figure 1a is a development showing the faces of a portion of the field poles of the generator and showing damping means.

Referring to Figure 1, portions of field poles N and S of a synchronous generator are shown. The field element of the machine rotates with respect to a stationary armature element having an inner periphery indicated at A—A; the three-phase armature windings are indicated by the crosses, the small circles, and the dots; the crosses indicate phase 1, the circles phase 3, and the dots phase 2 opposite each field pole and wound in the usual manner. The field windings of the poles are designated by the letters C and C'. Within the face of each pole are heavy bars D, preferably of copper, which extend across the face of the poles and are located in slots that are nearly closed over the bars at the surface of the poles, leaving slotted openings E. The heavy damping bars D are connected at their opposite ends, as shown in Figure 1a, to circular short-circuiting rings F which are located at opposite sides of the poles respectively and are likewise of low resistance non-magnetic material, such as copper or bronze. Thus the damping means applied to the poles of the generator form a type of squirrel-cage winding with open spaces between adjoining poles of the machine. It is this preferred form of generator having a highly damped electromagnetic circuit in combination with the regulator disclosed herein that obtains the highly advantageous results of the present invention.

Figure 2:
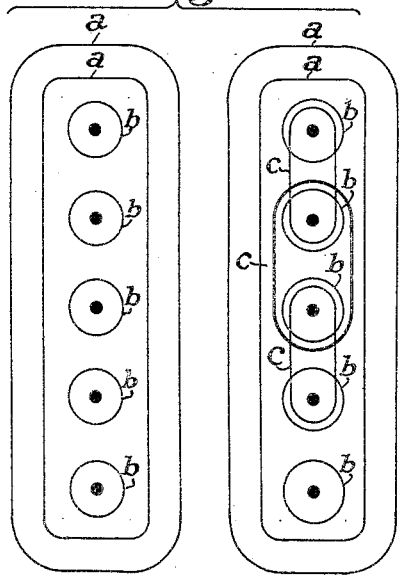
Figures 2 to 5 are explanatory diagrams.
Figure 3:
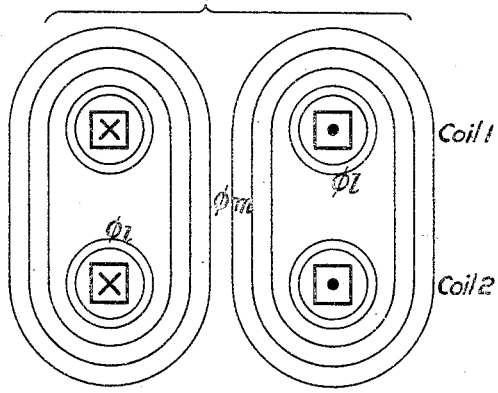

In Figures 1, 2, and 3 are illustrated flux lines and linkages as applied to individual conductors and windings—showing their inductive relationships. Any inductance may be considered as a number of flux lines linking a given winding. Some of these flux lines may link only partially while others link all of the turns of the coil. Figure 2 indicates a winding having a coil made up of turns represented by the dots. The flux lines $a$ are shown linking the entire coil while the flux lines $b$ link only one turn each and the flux lines $c$ are shown linking two turns. Various other relationships likewise occur. It is a matter of convenience in making design computations to consider all the flux lines in relation to the winding as a whole and to take the sum of linkages thus determined for obtaining the total inductance. That is, for example, a flux line $b$ that links only one turn of a winding having five turns would be considered as one-fifth of a total linkage. Such a summation is the type usually considered when computing the inductance by the usual methods and the result may be called total inductance, effective inductance or self-inductance. Lines such as $b$ or $c$ are called partial linkages.

When two or more coils or turns are in proximity, as illustrated in Figure 3, there are certain flux lines that link both coils called mutual linkages or mutual inductance $\phi m$. There also exist at the same time flux linkages in any one coil that do not link the other coil, such as $\phi l$ in Figure 3, although when added to $\phi m$, they do make up the total inductance or self-inductance of any one coil taken alone. For the purpose of convenience, we will distinguish the lines $\phi l$ by designating them as leakage inductance. It will be noted that the mutual linkages or mutual inductance $\phi m$ alone can be employed for transferring power from coil No. 1 to coil No. 2 of Figure 3, and when an iron core is placed so as to form the magnetic circuit, the flux linkages are greatly increased due to the permeability of the iron.

Lenz's law states that an induced current is always directed in such a manner as to oppose the cause of its production, thus if the mutual flux of any circuit is surrounded with low resistance, short-circuited windings such as here contemplated and disclosed as dampers in the machine section of Figure 1, it will be impossible for the mutual flux to change rapidly. In attempting to change it will induce a voltage in the short-circuited turn that will cause current to flow and tend to maintain the flux; and, as the resistance of such a circuit can be made very low and the total inductance can be made high, the time required for an appreciable change in flux can be of comparatively long duration of the order of several seconds if necessary. The well known exponential function is $$e^{-\frac{Rt}{L}}$$

where R represents resistance, $t$ represents time, L represents inductance, and $e$ is the natural logarithmic base.

Again referring to Figure 1, each of the windings exhibits the various kinds of inductance previously mentioned. The flux that accounts for the air gap voltage normally considered as appearing at the terminals of the machine after the leakage reactance drop has been subtracted, is a mutual flux indicated as $\phi m$. The amount of this mutual flux present in any machine is dependent upon design considerations, proportions, number of conductors, etc., that are required to develop a given voltage at normal machine speed. The greater the amount of $\phi m$, the higher the inductance of all windings interlinked; and, in the regulation system under consideration, we have found the desirability of designing for a high inductance, particularly as will appear, high mutual inductance. $\phi m$ is finally a resultant flux set up by the action of all magnetizing windings and under steady load conditions is constant in value.

For the purpose of description, we will consider the action when the load on the machine is suddenly increased resulting in an increase in armature current. Where the armature current suddenly increases, ampere turns (IN) appear on the armature surface A—A constituting a magnetomotive force. If the load has a lagging power factor, as is usually the case, this magnetomotive force begins to reduce the mutual flux, but owing to the presence of the damping winding and the high inductance and high mutual inductance of the generator, such flux $\phi m$ is prevented from changing suddenly and the new flux linkages surrounding the armature winding that result from the increase in current are forced to seek other paths such as in the winding end zones, etc. There will, however, be a slow decrease of the flux $\phi m$ and the better rate at which that occurs is proportional to the effectiveness of the better damper winding provided.

The voltage regulator system in responding to the slight decrease in terminal voltage by means of voltage-sensitive agencies, initiates an action to increase the excitation current in the field windings C—C'. At first, the field winding will exhibit a very low inductance as no flux due to the additional current can penetrate the mutual flux path due to the damping action of the short-circuited bars as previously described and must thus seek leakage paths. It therefore follows that the actual current in the field coils can grow rapidly as the transient inductance is low. The ampere turns thus added to the field coils begin to cause the mutual flux to grow slowly and to offset the previously-mentioned tendency for it to decrease due to the increase in ampere turns of the armature winding. The action of the regulator is thus such as to cause these two actions to gradually balance to load conditions and to minimize fluctuations to an imperceptible value above and below such balance to thus maintain a substantially constant voltage at the machine terminals.

The action of the system of the present invention is represented by the oscillograms of Figure 7. They show the effect of a sudden load increase thrown on a machine already carrying a certain amount of load. In this figure the field current wave is indicated at 1. Its variable shape is due, in part, to the action of the regulator in the rectification process and in part to the inherent characteristics of field circuits. The line current wave of the machine is indicated by 2 and shows a rapid increase as the load is thrown on. The line voltage wave is indicated by 3 and shows very slight variations sufficient to actuate the regulator, but not sufficient to cause blinking of lights that might be connected to the line. The field current 1, while increasing a considerable amount, still maintains its general shape but shows no sudden transient increase as occurs in the devices of the prior art. A timing wave is shown at 4.

Figure 4:
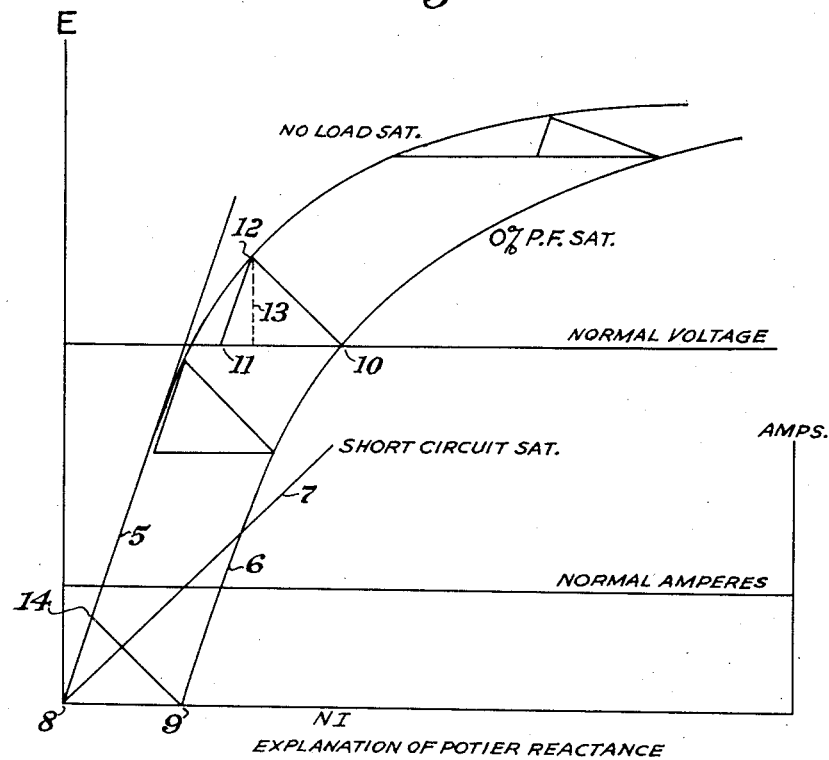
Figure 5:
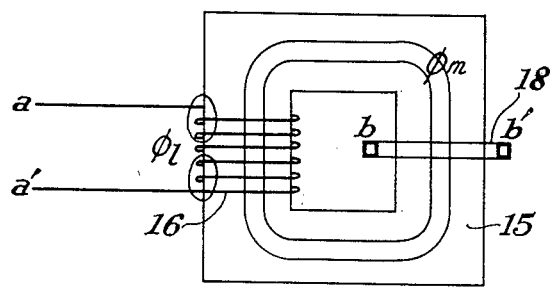

Referring particularly to Figures 4 and 5, we have considered the problem from the standpoint of the Potier reactance of a machine. This kind of reactance is referred to more particularly when dealing with synchronous machines in accordance with the cylindrical rotor theory and is a very useful concept for explaining the actions involved.

The Potier reactance is a sort of equivalent internal reactance that includes the effect of leakage flux lines in such paths as are completed in air, but it further includes a certain amount of leakage that takes place due to the presence of iron on both sides of the air gap that may be considered as tooth tip leakage or the more familiar zig-zag leakage of an induction motor. This reactance is usually referred to by describing the method of determining its value.

In Figure 4, we have shown a no-load saturation curve 5, and a zero percent power factor curve 6, both of which are plotted with voltage as ordinates and field ampere turns as abscissae. There is also a short-circuit saturation curve 7 plotted with amperes for ordinates against the field ampere turns as abscissae. Such curves are test curves ordinarily taken for synchronous machinery.

The point marked 9 on the base line is the starting point for the zero percent power factor curves and in laying out the Potier triangle, it is customary to measure the distance 8—9 on the base line, lay it off to the left of the point 10 of the normal voltage line and from the point 11 so obtained; a line is drawn parallel to the air gap line 5—8 that determines the point 12 at the intersection of the no-load saturation curve. Points 10 and 12 are connected by a straight line thus forming the oblique triangle 10—11—12 which is known as the Potier triangle. This triangle in most machines has a peculiar property of fitting between the no-load and full-load zero percent power factor saturation curves almost all the way up, as is indicated in the figure. However, at high values of saturation, the triangle changes shape as indicated, a matter which will be further explained. Dropping a perpendicular from the point 12 to the normal voltage line gives the height of the Potier triangle marked in Figure 4 as represented by the vertical line 13 and the ratio of the height of this triangle to the distance between the (NI) or zero voltage line and the normal voltage line will give the so-called Potier reactance per unit.

It is well known that Potier reactance is, in general, much greater than the leakage reactance of a given machine and that at high values of saturation, the height of the Potier triangle gives a per unit reactance that is almost identically equal to the per unit leakage. It thus becomes apparent that the iron circuit until saturated greatly increases the value of the Potier reactance.

This reactance has been described in order to explain why a sudden increase or decrease in load on the generator, as constructed in accordance with the principles of our invention, will result at first in only a slight change in voltage, that is, due to change in leakage flux lines about the parts of the coils in the air. Inasmuch as the relative percentage of such lines compared to the total Potier reactance is very small, it requires a very considerable change in load to suddenly affect the terminal voltage of the generator more than a fraction of a percent. This slight initial change in voltage that accompanies changes of load within the generator capacity is sufficient to actuate the sensitive electronic regulator associated with the system of the present invention.

It will also be apparent that the presence of a very effective damping winding tends to maintain, as was explained before, the air gap flux, and the only variation that can occur during the first few cycles after a load change resides only in that part of the Potier reactance that is unaffected by the presence of the cage winding or the presence of unsaturated iron in the neighborhood of the conductors and slots. Prior systems are of a character as to be seriously hampered by the presence of a damping winding and their oscillograms show wide and striking differences in operation over the present system, particularly as regards variations in and over and under terminal voltage regulation.

It will be apparent that any single magnetic circuit such as shown in Figure 1, may be considered as reducible to Figure 5. The latter is a diagrammatic representation of an iron core 15 having an exciting winding 16 on the opposite leg of which is a short-circuited turn 18. The exciting winding may represent the armature or the field and the short-circuited turn represent the dampening circuit of the present invention. The fact that the field poles rotate with respect to the armature has no particular significance as far as the magnitude of the fluxes is concerned, as the magnetomotive forces of the armature rotate at an equal speed. It thus follows that the magnetic circuit of Figure 1 can be considered as a stationary reactor as set forth in Figure 5. An attempt to increase the ampere turns of the exciting winding 16 of Figure 5 will have no sudden influence on the mutual flux $\phi m$. It thus follows that adding a dampening winding 18 to the generator and utilizing it as previously described to slow down the rate of change of the mutual flux actually results in materially changing the characteristics of the generator, providing what amounts to a series of parallel, highly-damped reactors that will function as previously described.

The generator is further designed in such a manner that the amount of total leakage flux on the synchronous basis, that is, the true leakage component of the Potier reactance, will be small in proportion to the whole, in order that on a sudden load change, the amount of variation in voltage will be only sufficient to actuate the regulator; and, the generator is made sufficiently sluggish that by the time the regulator has built up a greatly increased current in the field coils (which is allowed due to the fact that the field under these conditions will not exhibit a very high inductance due to the presence of the effective damping winding) that the net result becomes an interchange of magnetomotive forces in the generator air gap in such directions as to cause the useful gap flux to be stably maintained.

As shown particularly by the oscillograms of Figure 7, we avoid attempting to bring back the voltage after it has partially collapsed, but on the other hand we maintain it within very slight or substantially imperceptible changes in value even upon a sudden increase or decrease in the load and gradually bring the value from this slight change to normal. The change is so small as to be substantially imperceptible except by use of a high speed oscillograph.

In Figure 6 a synchronous generator having high inductance, high mutual inductance, low leakage, and a highly damped electromagnetic circuit of a character such as already described is indicated, and has a stator 20 and field winding 21. The machine supplies the three-phase distribution lines 22. In series with the field winding 21 is the usual adjustable rheostat 21a. The exciter armature 23 is shown connected across or in shunt with the field winding 21 and rheostat 21a of the main machine and supplies direct current thereto; an exciter field winding is indicated at 23a.

The connections are arranged in order that the main machine may operate at times without automatic control when conditions make it desirable; the parts are shown in condition for such operation. For this purpose the exciter field winding 23a is connected at one end to the negative terminal of the exciter armature and at the other end to a movable contact 24 of an electromagnetic switch having a controlling winding 25, and thence, through a fixed contact 24a through an adjustable rheostat 23b to the positive terminal of the exciter 23. Under automatic control the contact 24 is opened (normally open) and the exciter field winding 23a is then supplied with energy from the controlling apparatus.

For simplifying the description of the operation of the various switches involved in the circuits shown, we have referred to switches which are normally open by "n. o." and have referred to switches which are normally closed by "n. c." These designations or abbreviations have been employed throughout the specification in designating the normal position of the particular switches or contacts involved, although it will be apparent that they can and will take other positions.

A transformer 22a supplies energy to the controlling means. Its primary is connected across the two outer mains 22 at or near the main generator. Its secondary has its terminals and a mid-tap connected to the fixed contacts of a three-pole manual switch A having movable elements 26a, 26b and 26c. The two outer elements 26a and 26c are connected to a primary winding 27 of a transformer having secondary windings 27a to 27g. The mid-tap element 26b is connected to negative terminals of the exciter armature 23 and of the field windings 23a and 21.

The winding 25 of a magnetic switch B controls another movable contact 28 adapted to engage a fixed contact 28a. Under automatic control the contact 28 is closed (normally closed) and the contact 24 is open (normally open).

Another electromagnetic switch C has a controlling winding 29 which actuates three contacts 30, 31 and 32 to their closed positions (normally closed) against their respective fixed contacts 30a, 31a and 32a when the automatic control is active. The winding 29 is connected at one end through a normally open (normally open) push button switch 33 to the movable contact 26c and at the other end to the contact 26a. The contact 28a of the upper switch B is connected directly to the movable contact 26c of the manual switch while the movable contact 28 is connected to the upper terminal of the winding 29 and to the fixed contact 30a of the lower switch C. The movable contact 30 of switch C is connected to one terminal of winding 25 of switch B. The other terminal of the winding 25 is connected to the contact 26a of the manual switch.

After the manual switch A is closed, a temporary closing of the push button switch 33 will first cause the closure of the lower magnetic switch C, the winding 29 being excited by the closure of its circuit from contact 26c, through switch 33 and through winding 29 to contact 26a. This closure connects the automatic controlling means to the field winding of the exciter as will be later explained.

After closing the contacts of the magnet winding 29, the winding 25 of the upper switch B is excited by a circuit from contact 26c, through switch 33, contacts 30a and 30, through winding 25 to contact 26a. This causes the opening of contact 24 which breaks the field circuit across the exciter armature giving full automatic control. It likewise causes a closing of contact 28 which completes a holding circuit for winding 29 of switch C directly from contact 26c through winding 29 to contact 26a and also completes a holding circuit through winding 25 by a circuit from contact 26c, contacts 28a and 28, contacts 30a and 30, through winding 25 to contact 26a. Thus when the push button switch 33 is released, the windings of the two magnetic switches B and C remain excited and continue to hold their contacts in position for securing automatic control of the generator voltage. The opening of the three-pole manual switch A at any time will deenergize the windings 25 and 29 of the magnetic switches; their contacts will then assume the positions shown in Figure 6, rendering the automatic control ineffective and closing the field circuit of the exciter across its armature.

Under automatic control, current is supplied to the exciter field winding 23a by two electric valves, or arc discharge tube rectifiers 34 and 35, shown at the lower portion of Figure 6, each having a cathode, control grid, and plate indicated by suffixes a, b, and c, respectively. The two cathodes 34a and 35a are heated by current supplied from the secondary winding 27a. Plate 34c is connected to the movable contact 32 of the lower magnetic switch C; the fixed contact 32a is, as before explained, connected to the contact 26c of the manual switch A. The plate 35c is connected to the movable contact 31; the fixed contact 31a is, as before explained, connected to contact 26a of the manual switch A. From a common connection of the cathodes 34a and 35a, a wire 36 extends to that terminal of the exciter field winding 23a that is connected to the contact 24 of the upper magnetic switch B.

The plate circuits of the power rectifiers 34 and 35, when operative, may be traced as follows: from contact 26a and one terminal of the secondary of transformer 22a, through contacts 31a, 31 to plate 35c, through the tube 35 to cathode 35a, to wire 36, through the exciter field winding 23a to contact 26b, and then, to the mid-point of the secondary of transformer 22a; and similarly from contact 26c and the other terminal of the secondary through contacts 32a, 32 to plate 34c, through the tube 33 to cathode 34a, to wire 36, and through the exciter field winding 23a to the mid-point of the secondary of transformer 22a. Thus the power tubes 34 and 35 serve to supply full wave rectified current to the exciter field winding 23a.

The control of the voltage applied to the exciter field winding 23a by the power tubes 34 and 35 is accomplished by shifting the phase of the potential of the grids 34b and 35b of these tubes relative to the anode potential. The grids are respectively connected through grid resistors 37b and 38b to the terminals of a secondary winding 39 of a grid transformer having a primary winding 40. A connection from a mid-tap of this secondary extends to a common connection of the cathodes 34a and 35a. The primary 40 is connected at one end to a mid-tap of the secondary winding 27b and at the other end to a point 41, the phase of which is shifted according to the requirements of control. A capacitor 63 is connected from point 41 to an outer terminal of the secondary 27b forming a branch connection from point 41.

The other branch connection from point 41 to the other outer terminal of the secondary 27b includes a circuit of resistance variable over wide limits according to control requirements; and it is by this means that the phase of point 41 is shifted for changing the phase of the grids 34b and 35b as needed to cooperate with the damping means and other characteristics of the main generator for maintaining its voltage substantially constant under abrupt load changes.

A vacuum tube 42 having a cathode 42a, grid 42b, and anode or plate 42c serves to change over wide limits, as may be necessary, the resistance of the branch circuit from point 41 to the right-hand terminal of the secondary 27b. The cathode 42a is heated by current from the secondary 27d; and, the plate circuit may be traced from point 41 to a mid-tap of the secondary 27d, through the secondary winding 27d to the cathode 42a, through the tube 42 to anode 42c, and then, through a protective movable arm 43 of an automatic switch D to the righthand terminal of the secondary 27b. The switch D is normally closed (normally closed) and is adapted to be opened by a controlling winding 44 which is subjected to a voltage corresponding to the voltage of the main generator. For this purpose, the secondary 27c is connected to a bridge-connected contact type of rectifier 45, such as of the copper oxide form, the winding 44 being connected to its positive and negative terminals.

The electromagnetic switch D is preferably made sensitive to small differences of current in opening and closing values and may be adjusted to open upon as small an increase in voltage of the main generator as 1.5 percent above normal. Under normal voltage conditions, this relay does not receive enough current to open its contacts, but if from any special cause the voltage becomes high enough, the relay will open its contacts. This opens the plate circuit of the tube 42 and as a result, the current to the plate circuits of the tubes 34 and 35 is cut off, thus reducing the exciter armature voltage and in turn reducing the voltage of the main generator. This provides over-voltage protection for the system in case of failure of the control to function properly. Upon reduction of the generator voltage, the relay contacts are automatically reclosed and the system resumes its automatic control.

The resistance of the branch circuit including the tube 42, already described, is varied in accordance with regulation requirements by adjusting the potential of the grid 42b. This is accomplished by a controlling vacuum tube 46 having a cathode 46a, and anode or plate 46c. This tube is operated at substantially plate saturation, and thus, a small change in temperature of its cathode results in a relatively large change in its plate circuit current. The cathode 46a is supplied with current derived from the secondary winding 27g through a contact type bridge-connected rectifier 47; therefore current supplied to the cathode 46a will be responsive to any change from normal in the main generator voltage. The cathode circuit may be traced from the positive terminal of the rectifier 47 through an adjustable resistor 48, a fixed current limiting resistor 49, a control rheostat 50, through another adjustable resistor 51 and through the cathode 46a to the negative terminal of a rectifier 47. The rheostat 50 is for the purpose of adjusting the voltage of the main generator to the value at which it is desired to be maintained. The adjustable resistor 48 is for damping the effects of the controlling apparatus by electrical anti-hunting means, as will be explained later; and the adjustable resistor 51 is for securing an advantageous supplementary controlling effect to be later explained.

The plate circuit of tube 46 derives its power from the secondary winding 27f, the circuit being from the plate 46c through a series fixed resistance 52, secondary winding 27f, to the cathode 46a. The grid 42b is connected to the plate 46c and a terminal of the resistance 52. The drop in potential in resistance 52 is dependent upon the value of the current passing in the plate circuit and as this current varies in accordance with control requirements, the potential of the grid 42b will be changed correspondingly for changing the resistance of the plate circuit of tube 42. In order to increase the sensitiveness of response by increasing the change in the controlling grid potential, the secondary winding 27e has one side connected to the cathode return of the tube 42 by a connecting wire 53; and across this secondary is connected a potentiometer resistance 54 having an adjustable contact 54a. The latter is connected to the terminal of the resistance 52 opposite to the terminal to which the grid 42b and plate 46c are connected. By shifting the contact 54a along the resistance 54, its voltage may be made to range from that of one terminal of the secondary 27e to that of the other terminal. It is adjusted to a position that its phase is approximately 180° from that of the terminal of resistance 52 to which it is connected and by its opposing potential causes the change in potential of the grid 42b to greatly vary upon any change of current value in the plate circuit of tube 46.

The sensitiveness of response is further increased by the provision of an additional responsive control which imposes its effect upon the apparatus already described. This control introduces a modifying action in response to change of current in the load circuit of the machine. For this purpose a current transformer 55 is shown introduced in the middle supply line 22 and its terminals are connected to a rectifier 56 shown as of the bridge-connected contact type. Across the current transformer winding is connected an adjustable resistance 57 for applying a proper amount of current to the rectifier. From the negative terminal of the rectifier a connection is made to a terminal of the variable resistance 51, already described, through a condenser or capacitor 58. The other terminal of the resistance 51 is connected to the positive side of the rectifier 56. The voltage output of the rectifier 56 is proportional to the current in the load line. Under steady load conditions, the voltage of the rectifier is constant and no current flows at that time in the rectifier load circuit because the capacitor 58 will not pass current when a non-fluctuating direct current voltage is impressed across it. However, when a change of load occurs, the capacitor 58 will pass current through the resistance 51 depending upon the rate of change of the output voltage of the rectifier 58. A resistance 55 is shunted across condenser 58 and resistance 51; thus, passage of current through the capacitor upon any change of load of the main generator will impose a voltage upon the resistance 51 which will either be additive or substractive to the voltage in the circuit of the cathode 46a depending upon whether the main load on the generator is decreased or increased. An increase in the main load causes a transient controlling effect to be applied to the resistance 51 in such a direction as to oppose and reduce current in the cathode circuit and thereby accentuate the required controlling effect whereas a decrease of the main load imposes a transient voltage on the cathode circuit in the opposite direction and thereby intensifies the corrective action of the controlling apparatus. As the change in load current takes place an appreciable time before the terminal voltage of the main generator materially changes, this supplementary influence imposes an anticipatory action on the controlling apparatus before reduction in the voltage of the main generator takes place and before the change in voltage of the secondary winding 27g, due to slight change in the main generator voltage, occurs.

Such supplementary transient controlling effect upon a change in load of the main generator is particularly desirable where abrupt load changes occur. The duration and amplitude of the transient current effect upon the cathode circuit of the tube 46 may be adjusted by altering the value of the capacitor 58 or resistor 51, or both. This control is important as it permits close cooperation between the output of the regulator and the characteristics of the generator. This method of utilizing a transient corrective response to load changes is quite superior to the use of compound windings on the generator, because in the latter case the effect of the control is not only retarded, but owing to the load currents being of any power factor, the actual voltage regulation may be poor upon the resumption of steady load conditions. The present method is also advantageous in that it permits the use of conventional cross-current control between generators when operated in parallel.

Anti-hunting control is obtained by imposing a voltage upon the cathode circuit of the controlling tube 46, effecting a change of voltage of the exciter armature by the controlling apparatus, and employing a transient impulse or impulses of voltage to dampen the controlling action and thereby prevent hunting. For this purpose one terminal of the adjustable resistor 48 in the controlling cathode circuit is connected to the negative terminal of the exciter armature 23 by the wire 59 and another adjustable contact 60 of the resistance 48 is connected through a capacitor 61 to the positive terminal of the exciter armature 23 by a wire 62. Under normal or steady conditions, no voltage is applied to the resistance 48 by the anti-hunting control, because no current then passes to or from the capacitor 61; but, upon change of voltage of the exciter armature 23, an electromotive force is applied to the resistance 48 which is a function of the change of voltage of the exciter armature. The momentary discharge of the capacitor 61 when the voltage of the exciter armature 23 is rapidly decreasing will act to oppose the change of voltage applied to the resistance 48 by the bridge-rectifier 47; and, the momentary charge of the capacitor 61 when the voltage of the exciter armature is rapidly increasing will act upon the resistance 48 to oppose the change in voltage applied to it by the rectifier 47. This damping effect follows from the rapid change of current in the field winding 23a of the exciter and from the change in exciter voltage to oppose the corrective action in each direction and thereby avoids any hunting effect in the regulation. We have determined that the anti-hunt effect is increased by increasing the rate of charge of the exciter voltage; thus, we have provided a combination or circuit arrangement having a very fast exciter voltage change.

In summarizing the operation, as already explained, the apparatus in Figure 6 shows the parts in position without automatic control and in order to impose automatic regulation upon the generator, the manual switch A having the parts 26a, 26b and 26c is closed. This closes the circuit of the primary 27 of the controlling transformer and permits its secondaries to supply heating current to the cathodes or filaments of the four tubes. After a short interval for obtaining such heating, the push button switch 33 is momentarily closed which, as already explained, results in exciting the windings 25 and 29 of the magnetic switches B and C and places the contacts in position for obtaining automatic regulation, opening the field circuit of the exciter 23.

Assuming that the rheostat and capacitors have been properly adjusted for maintaining the desired voltage of the main generator, the effect of an abrupt increase in load tending to cause a decrease in voltage will first be considered: The provision of the damping means in the electromagnetic circuit of the main generator causes the highly damped electromagnetic circuit provided with inductance and low leakage to oppose and delay any change therein, as has already been described. During damping of the main generator, the highly sensitive controlling opparatus responds to a slight decrease in voltage of the mains 22, giving a decrease in the voltage supplied to the rectifier 47 by the transformer secondary winding 27g. This reduces the current in the cathode circuit of the tube 46; and, the reduced heating of the cathode 46a makes a pronounced change in the current of the plate circuit of tube 46. This results in changing the potential of the grid 42b of the tube 42 in the manner already explained, resulting in a wide change of resistance in the plate circuit of this tube and a corresponding shifting of the phase of the point 41. This results in shifting the phase of the grids 34b and 35b of the power tubes and causes the field winding of the exciter to be supplied with a pronounced increase in its current which raises the exciter armature voltage and the current supplied to the field winding 21 of the main generator 20 by a rapid and pronounced increase; this pronounced increase in the voltage and current of the field winding of the main generator occurs before reactions in the main generator can materially reduce its voltage, for reasons previously explained, including the high damping of its electromagnetic circuit. In this manner the voltage of the main generator is prevented from changing materially before the transient effects of the sudden increase in load have had an opportunity to reduce the generator voltage. The sensitiveness of response of the controlling apparatus is aided further, as well as its rapidity of response to change in load, by an impulse derived from the current transformer 55 which hastens and amplifies the corrective action of the exciter 23 and field winding 21 of the main generator 20 in the manner already explained.

The pronounced increase in voltage of the exciter armature 23, in turn, causes the anti-hunting means to act to check and dampen the corrective action, in order to impose a steady influence upon the controlling apparatus after its pronounced corrective effect has taken place, and to thereby maintain the generator voltage at its desired value. Thus, the pronounced corrective change of current in the main field winding 21 of the generator acts to maintain the voltage of the generator upon any abrupt increase in load before the reactions in the main generator have an opportunity to reduce the generator voltage and before appreciable change in the generator voltage takes place. Upon a sudden decrease in load the reverse action takes place to prevent any increase in voltage of the main generator. Under any change of load the controlling apparatus in cooperation with the highly damped electromagnetic circuit of described characteristics of the main generator serves to apply a proper corrective change before the transient effects of a change in load can materially affect the voltage of the main generator.

It will be apparent from a study of the drawings as well as an evaluation of the previous description that the regulator, in effect, adds the voltages of the various phases of the supply line to operate the regulator. This regulator, of course, includes a pair of grid-controlled rectifiers for controlling a high voltage pulsating direct current to the exciting system. As previously pointed out, main flux changes in the exciting system are materially delayed due to the high inductance, high mutual inductance, and low leakage reactance of the electromagnetic system, including the use of a dampener, all of these materially delaying the flux changes until the regulator can be effective. Also, as previously pointed out, the dampener in cutting down on the leakage flux speeds up the initial effect of the pulsating current upon the exciter field winding of the generator.

Briefly summarizing, it will be noted that we provide a useful interchange of magnetomotive forces in the generator air gap in such directions as to cause the useful flux, namely, the mutual flux, to be stably maintained; it is at least initially maintained by the specially designed inductive parts of the generator. A highly inductive dampener winding, a field winding of greater inductance than armature winding, an armature winding having low leakage flux, and an exciter providing a high voltage push or jolt are representative features which enter into or aid in obtaining the desired results. It will be apparent from the previous discussion that the relationship is such that a low initial field inductance is provided until the regulator has had an opportunity to supply regulating or exciting current thereto.

Although a particular embodiment of the invention has been shown and described, various changes, additions, substitutions and modifications may be made without departing from the scope of the invention. In some cases the controlling apparatus may apply its controlling effect directly to the field winding of the main generator instead of utilizing an exciter.

We claim:

1. In a dynamoelectric system for supplying a substantially constant voltage at armature terminals of an electric generator, the combination of an electric generator having armature and field electromagnetic circuits adapted to move relatively with respect to each other and to provide a main generator electromagnetic circuit, said field circuit having means providing it with greater effective inductance than said armature circuit; an exciter, said exciter having means connected to respond to changes in line voltage, and means adapted to impress a corrective current upon said field circuit in response to the changes in line voltage; means operably associated with said main electromagnetic circuit to set up a flux opposing a change in mutual flux due to a change of line voltage, said last-mentioned means being proportioned to delay a change of mutual flux of the main electromagnetic circuit until said exciter has impressed a corrective current on said field circuit.

2. In a dynamoelectric system for supplying a substantially constant voltage at armature terminals of an electric generator, the combination of an electric generator having armature and field electromagnetic circuits adapted to move relatively with respect to each other to provide a main electromagnetic circuit, said field circuit having portions providing it with a greater inductance than said armature circuit; an exciter, said exciter having means connected to respond to changes in line voltage, and means adapted to impress a corrective current in response to the changes in line voltage upon said field circuit; means operably associated with said main circuit and having portions providing an inductance opposing a change in flux of the main circuit, said exciter being constructed and arranged to impress a corrective current on the field circuit before a substantial change of flux in the main circuit can occur as delayed by said last-mentioned means.

3. In a dynamoelectric system for supplying a substantially constant voltage at armature terminals of an electric generator, the combination of an electric generator having armature and field electromagnetic circuits adapted to move relatively with respect to each other and to provide a main electromagnetic circuit, said field circuit having portions providing it with a greater inductance than said armature circuit, said armature circuit having portions providing its circuit with low leakage reactance; an exciter, said exciter having means connected to respond to changes in line voltage, and means adapted to impress a corrective current in response to the changes in line voltage upon said field circuit; electromagnetic circuit means associated with said main circuit to set up a flux opposing at least initially a change in mutual flux of said main circuit due to a change of line voltage, said last-mentioned means being constructed and arranged to delay a substantial change of the flux of the main circuit until said exciter has impressed a corrective current on the field circuit.

4. In a dynamoelectric system for supplying a substantially constant voltage at armature terminals of an electric generator, the combination of an electric generator having armature and field electromagnetic circuits adapted to move relatively with respect to each other and to provide a main electromagnetic circuit, said field circuit having portions providing it with greater inductance than said armature circuit; an exciter, said exciter having means connected to respond to changes in line voltage, and means adapted to quickly impress a corrective voltage jolt upon said field circuit in response to the changes in line voltage; an inductive means operably associated with said main circuit to set up a flux opposing at least initially a change in mutual flux of the main circuit, said exciter impressing a voltage jolt of a value substantially above a normal regulator voltage upon said field circuit before a substantial change of flux in the main circuit can occur as delayed by said last-mentioned means.

5. In a dynamoelectric system for supplying a substantially constant voltage at armature terminals of an electric generator, the combination of an electric generator having armature and field windings adapted to move relatively to each other and provide an electromagnetic circuit, said field winding portions providing it with a greater number of ampere turns than said armature winding to provide a stiff field; an exciter operably connected to said field winding to supply regulating current thereto, said exciter having means connected to respond to changes in line voltage, and means adapted to impress a corrective current in response to the changes in line voltage upon said field winding; means operably associated with at least one of said windings to set up flux opposing, at least initially, a change in mutual flux of the electromagnetic circuit represented by said armature and field windings, said last-mentioned means delaying a substantial change of main flux of the electromagnetic circuit until said exciter has impressed a corrective current on said field winding.

6. In a dynamoelectric system for supplying a substantially constant voltage at armature terminals of an electric generator, the combination of an electric generator having an electromagnetic circuit comprising armature and field windings, means insuring a low generator armature leakage flux, means associated with said generator electromagnetic circuit for delaying a change of flux therein due to a change in line voltage; an exciter operably connected to said field winding to supply regulating current thereto, said exciter having means responsive to changes in line voltage and having means adapted to impress a high voltage jolt of substantially three to eight times normal exciter voltage as a corrective current in response to such changes upon said field winding; both of said generator means being constructed and arranged to delay a substantial change in flux of said electromagnetic circuit until a regulating current has been impressed by said exciter upon said field winding.

7. In a dynamoelectric system for supplying a substantially constant voltage at armature terminals of an electric generator, the combination of an electric generator having an electromagnetic circuit comprising armature and field windings, said field winding having a greater inductance than said armature winding, an additional winding associated with said electromagnetic circuit and having a high ratio of inductance to resistance, said additional winding being constructed and arranged to at least initially delay a change of main flux in said electromagnetic circuit by setting up a flux opposing a change of main flux of said electrostatic circuit due to a change of line voltage; an exciter having means operably responsive to changes in line voltage, and means associated with said field winding and adapted to impress a corrective current thereon; the operation of said exciter being proportioned in such a manner that it will impress a corrective current on said field winding during the flux-change delaying action of said additional winding.

8. In a dynamoelectric system for supplying a substantially constant voltage at armature terminals of an electric generator, the combination of an electric generator having armature and field windings adapted to move relatively to each other, said windings providing an electromagnetic circuit for said generator, said field winding having means providing it with a higher inductance than said armature winding; an exciter operably associated with said field winding to supply regulating current thereto, said exciter having means responsive to changes in line voltage, and means adapted to impress a corrective current in response to the changes in line voltage upon said field winding; means operably associated with at least one of said windings to set up an inductance opposing, at least initially, a change in flux of said electromagnetic circuit; the operation of said last-mentioned means being proportioned to the operation of said exciter means in such a manner that the corrective current will be impressed before a change in flux due to a change of load as delayed by said last-mentioned means has substantially affected the armature voltage of the generator, said last-mentioned means being constructed and arranged to insure a low initial inductance of said field winding until said exciter means has impressed a corrective current thereon.

9. In a dynamoelectric system for supplying a substantially constant voltage at armature terminals of an electric generator, the combination of an electric current generator having armature and field windings adapted to move relatively to each other, said windings providing an electromagnetic circuit for said generator, said field winding having means providing it with a higher inductance than said armature winding; an electronic exciter having means responsive to load changes, and means adapted to impress a high voltage jolt upon said field winding in response to a load change; means operably associated with at least one of said windings to set up an inductance opposing, at least initially, a change in flux of said electromagnetic circuit; the operation of said last-mentioned means being proportioned to the operation of said exciter means in such a manner that the voltage jolt will be impressed on said field before a change in load has been able to substantially affect the generator armature voltage.

10. In a dynamoelectric system for supplying a substantially constant voltage at armature terminals of an electric generator, the combination of an electric generator having armature and field windings adapted to move relatively to each other and provide an electromagnetic circuit, said field winding having a greater number of ampere turns thans said amature winding to provide a stiff field, said magnetic circuit having a low armature leakage flux and a high mutual flux; an exciter, said exciter having means connected to respond to changes in line voltage, electronic means adapted to set up a high voltage corrective current in response to changes in line voltage, and means operably associated with said electronic means and with said field winding for impressing a voltage jolt upon said field winding from said electronic means to set up a corrective current in said field winding; means operably associated with said electromagnetic circuit to set up a flux opposing at least initially a change in mutual flux in said circuit until the voltage jolt has been impressed upon said field winding by said last-mentioned means.

11. In a dynamoelectric system for supplying a substantially constant voltage at armature terminals of an electric generator, the combination of an electric generator having armature and field windings adapted to move relatively to each other, said windings providing an electromagnetic circuit for said generator, said field winding having means providing it with a higher inductance than said armature winding; an electronic exciter having means responsive to load changes, and means adapted to impress a high voltage jolt of substantially three to eight times normal exciter voltage upon said field winding; means operably associated with at least one of said windings to set up an inductance opposing, at least initially, a change in flux of said electromagnetic circuit due to a load change, the operation of said last-mentioned means being proportioned to the operation of said exciter means in such a manner that the corrective current will be impressed on said field before a change in flux as delayed by said last-mentioned means has substantially affected the armature voltage of the generator.

12. In a dynamoelectric system for supplying a substantially constant voltage at armature terminals of an electric generator, the combination of an electric generator having armature and field windings adapted to move relatively to each other, said windings providing an electromagnetic circuit for said generator, said field winding having sufficiently more ampere turns to minimize magnetomotive forces of said armature winding due to a change of line voltage, an exciter operably associated with said field winding to supply regulating current thereto, said exciter having means responsive to changes in line voltage, and means adapted to impress a corrective current in response to the changes in line voltage upon said field winding; means operably associated with at least one of said windings to set up an inductance opposing, at least initially, a change in flux of said electromagnetic circuit, the operation of said last-mentioned means being proportioned to the operation of said exciter means in such a manner that the corrective field current will be impressed before a change of flux as delayed by said last-mentioned means has substantially affected the armature voltage of the generator.

13. In a dynamoelectric system for supplying a substantially constant voltage at armature terminals of an electric generator, the combination of an electric generator having armature and field windings adapted to move relatively to each other, said windings providing an electromagnetic circuit for said generator, said field winding having means providing it with a higher inductance than said armature winding such that said field winding has sufficiently more ampere turns to minimize magnetomotive forces of said armature winding due to a change of line voltage, an electronic exciter having means responsive to line changes and line voltage, and means adapted to impress a high voltage jolt of substantially three to eight times normal exciter voltage upon said field winding; means operably associated with at least one of said windings to set up an inductance opposing, at least initially, a change in flux of said electromagnetic circuit, the operation of said last-mentioned means being proportioned to the operation of said exciter means in such a manner that the corrective current will be impressed before a change in flux due to a change of load as delayed by said last-mentioned means has substantially affected the armature voltage of the generator.

CHARLES C. HUTCHINS.
FRANK G. LOGAN.